Nov. 9, 1948.                    W. B. ENSINGER                    2,453,122
                REFLECTOR COLLIMATOR SIGHT FOR TORPEDO EJECTORS
Filed July 6, 1944                                         9 Sheets-Sheet 1
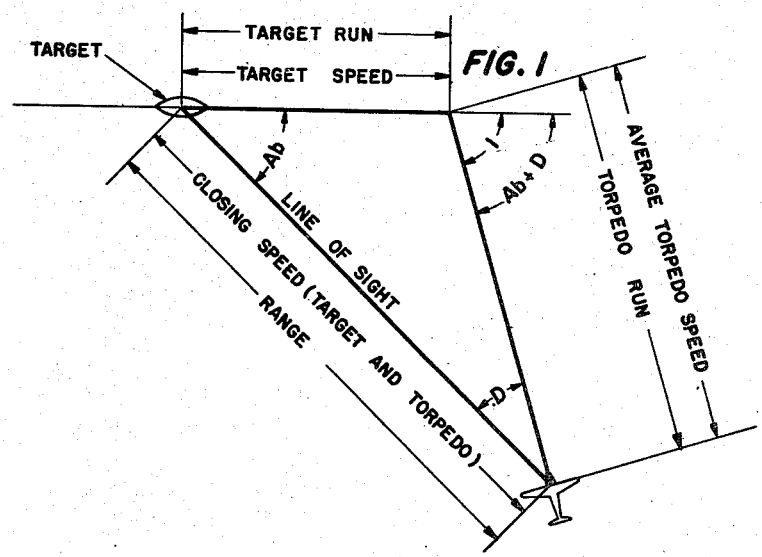
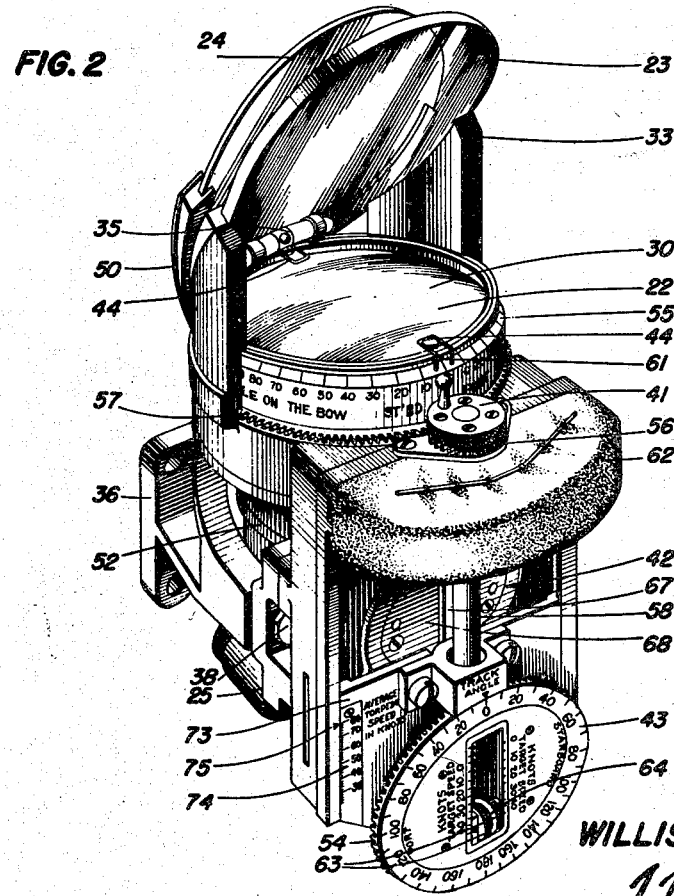
INVENTOR
WILLIS B. ENSINGER
ATTORNEY Nov. 9, 1948. W. B. ENSINGER 2,453,122
REFLECTOR COLLIMATOR SIGHT FOR TORPEDO EJECTORS
Filed July 6, 1944 9 Sheets-Sheet 2

INVENTOR
WILLIS B. ENSINGER
BY
ATTORNEY

Nov. 9, 1948.    W. B. ENSINGER    2,453,122
REFLECTOR COLLIMATOR SIGHT FOR TORPEDO EJECTORS
Filed July 6, 1944    9 Sheets-Sheet 6

INVENTOR
WILLIS. B. ENSINGER
BY
ATTORNEY

Nov. 9, 1948.  W. B. ENSINGER  2,453,122
REFLECTOR COLLIMATOR SIGHT FOR TORPEDO EJECTORS
Filed July 6, 1944  9 Sheets-Sheet 7

INVENTOR
WILLIS B. ENSINGER
BY
ATTORNEY

Nov. 9, 1948.   W. B. ENSINGER   2,453,122
REFLECTOR COLLIMATOR SIGHT FOR TORPEDO EJECTORS
Filed July 6, 1944   9 Sheets-Sheet 8

INVENTOR
WILLIS B. ENSINGER
BY
ATTORNEY

Patented Nov. 9, 1948

2,453,122

UNITED STATES PATENT OFFICE 2,453,122

REFLECTOR COLLIMATOR SIGHT FOR TORPEDO EJECTORS

Willis B. Ensinger, Silver Spring, Md., assignor to the United States of America as represented by the Secretary of the Navy Application July 6, 1944, Serial No. 543,739

3 Claims. (Cl. 88—2.3)

(Granted under the act of March 3, 1883, as amended April 30, 1928; 370 O. G. 757)

This application relates to a method and apparatus for sighting torpedoes, guns and bombs, and more particularly for sighting torpedoes, guns and bombs when they are operated from aircraft.

In general the invention consists of a reflector sight and angle solver so combined as to enable the operator to perform the sighting function efficiently under the conditions generally existing when the sighting function must be performed.

An object of this invention is the provision of means for directing the launching of torpedoes.

Another object of this invention is the provision of a new and improved sight for dive bombing.

A further object of this invention is the provision of a new and improved sight for fixed guns.

Another object of this invention is the provision of a single sight which may be used either for the launching of torpedoes, or the release of dive bombs and the sighting of fixed guns as desired.

Another object of this invention is the provision of means for quickly and efficiently performing the sight function when launching torpedoes, releasing bombs and firing guns under the conditions generally prevailing when such launching, releasing and firing is required.

Another object of this invention is the provision of means for changing over in a single operation, such as setting a latch, from a torpedo director to a bomb and gun sight.

In the drawings:

Figure 1 illustrates the triangle to be solved.

Figure 2 is a perspective view from the left side of the sight.

Figure 14:
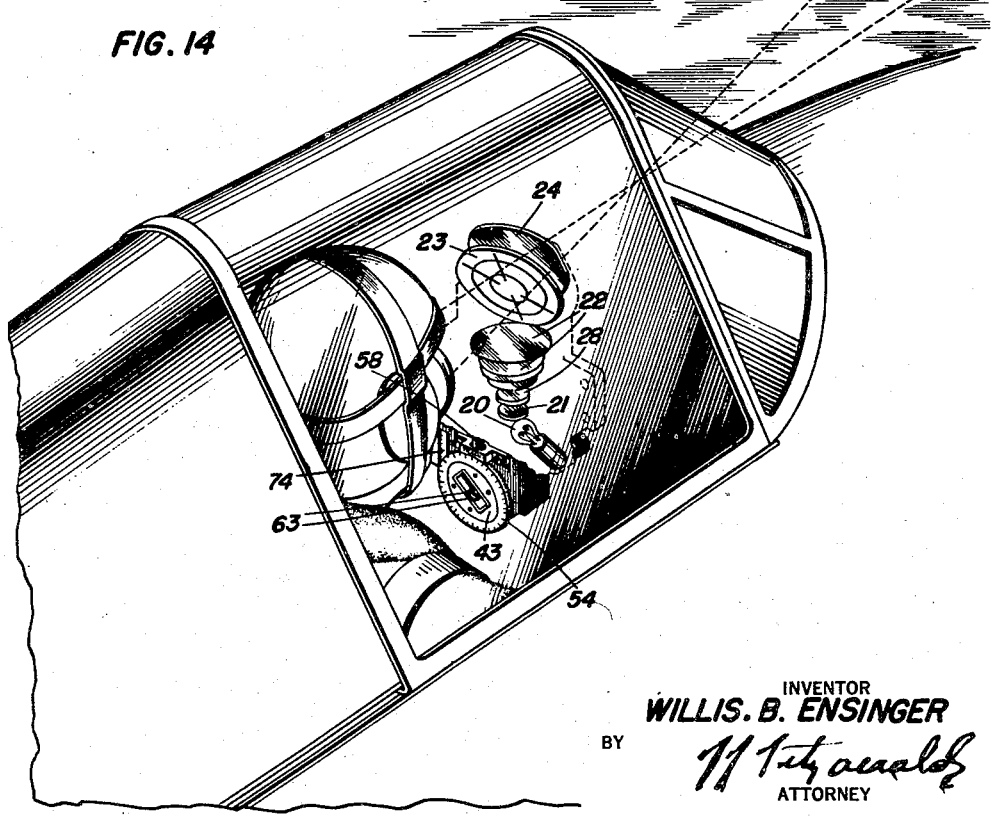
Figure 14 is a perspective view of the sighting action.

The understanding of how a device is used is often an aid to a clearer conception of the details of said device. Attention is directed to Figure 14 which illustrates the operator of an aircraft laying the sight on a target. Note the cut away portion showing the optical system which produces the sight pattern on the reflecting screen.

The reflector sight

Figure 8:
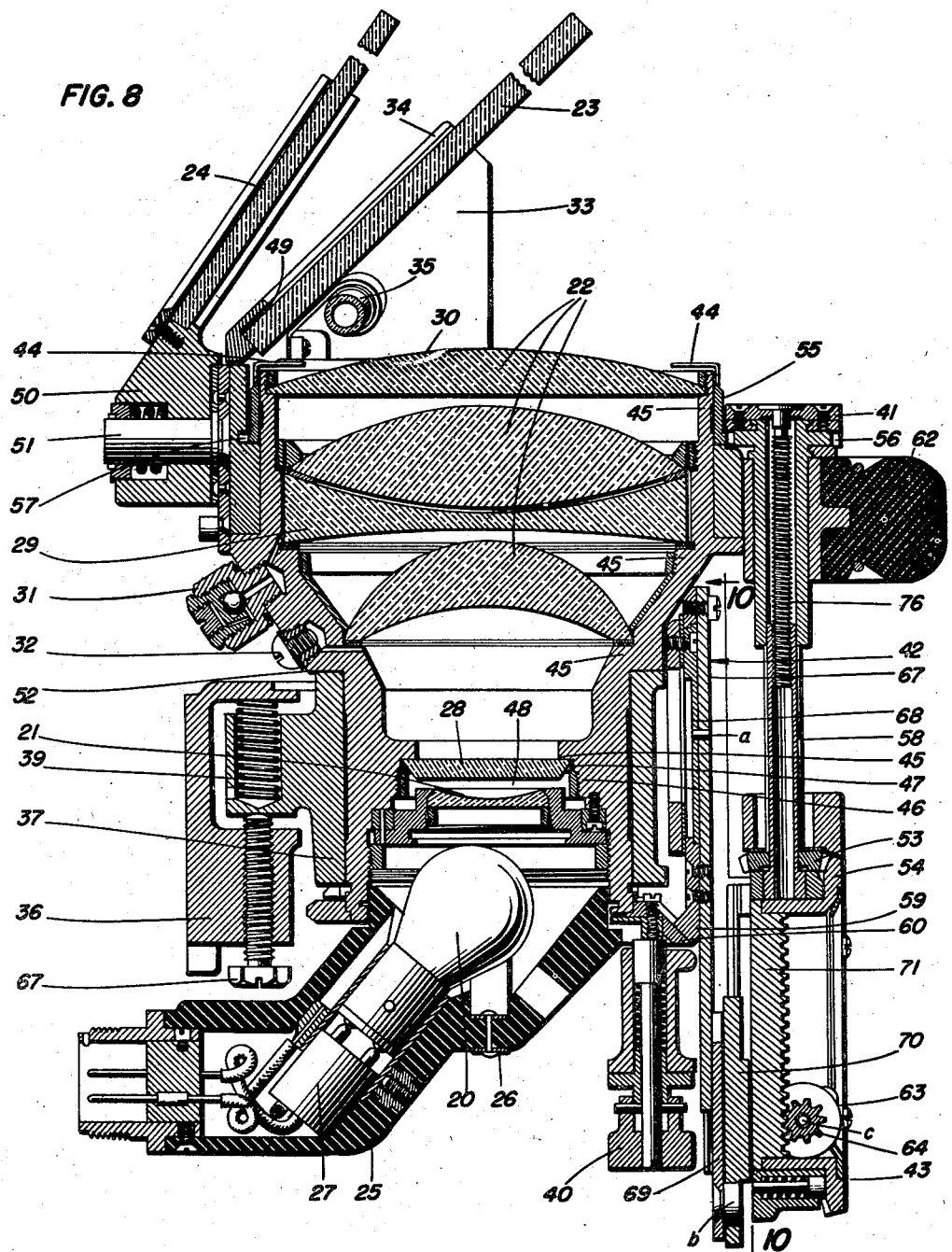
Figure 8 is a sectional view on line 8—8 of Figure 7.

The reflector sight as illustrated in Figure 8 is based upon the collimator principle of rendering the rays of light received by the eye from a projected image parallel so that they may intermingle with those received from a distant target and give the illusion that the image and target are substantially in the same vertical plane. Another advantage arising from this type of sight is that the errors involved from non-alignment of the sighter's eye with the sight are much less for this type and in general it is easier to use.

The reflector sight consists of a light source 20, a reticule 21, a projector lens system 22, a reflecting plate 23 and a sun filter 24.

The intensity of the light through the reticule is varied by a rheostat (not illustrated) which is provided in the lighting circuit of the airplane. For night use the light must be dimmed until nearly out to prevent the target from being blocked out by too bright a reticule image on the reflector plate. The necessary intensity of this light can only be determined by experience.

The lamp housing 25 is attached to the sight body by spring clips 26 operated by buttons extending from the walls of the lamp housing. The clips in turn engage a groove in the interior of the sight body. The housing is removed from the sight body by depressing the buttons on both sides of the lamp housing and pulling down to remove the housing and expose the bulb.

The lamp 20 is inside frosted, double filament, double contact bayonet base. The double contact socket 27 in the lamp housing 25 is wired to a double throw switch (not illustrated). This switch makes it possible to switch from one filament to another by merely throwing the switch in the other direction. The lamp is readily removable and replaceable after the lamp housing has been detached from the sight body. To remove the lamp from the housing it must be pushed in, rotated counterclockwise, and with-drawn. To replace the lamp it must be inserted in the socket, depressed and rotated clockwise or contact will not be made and no current will flow.

The reticule 21 is located in the focal plane of the lens system and is illuminated by the lamp bulb 20 in the lamp housing 25 clipped to the bottom of the sight body. The image of the reticule is projected upward by the lens system 22 and reflected toward the operator by the reflector plate 23 which is set at 45° to the vertical line of the optical system. The optical system is focused at infinity; therefore, the reticule image seems to be at a great distance and does not appear to move on distant objects when the eye is moved from side to side.

Figure 13:
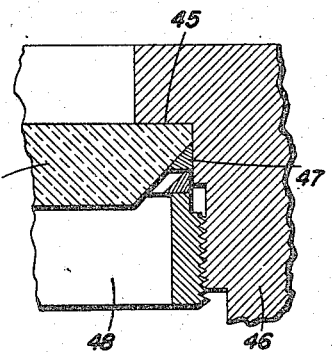
Figure 13 is a fragmentary sectional view of a lens mount.

The projector lens system is made up of a sealing window 28 and several lenses of an objective system 22. These lenses are mounted on seats 45 in the sight body 46 as illustrated in Figure 13. They are crown glass except the lower intermediate objective lens 29 which is dense flint. The sections of the sight between the sealing window 28 and the top objective lens 30 is made pressure-tight by using a rubber gasket between the top lens and its seat, and a rubber gasket 47 between the sealing window and its retaining ring 48 to seal the lower end of the section. Spacers with rubber gaskets below them are used between the two interior lenses and their seats. Saw kerfs in the spacers, and holes in one retainer, permit circulation of air in this pressure-tight portion of the sight. A gas valve 31 and an outlet plug 32 are provided for drying the air in this portion of the sight.

The plate glass reflector 23 has been selected for its parallel surfaces and it is supported by a cylindrical mount 33 whose top edge is machined at 45° to the vertical center line of the sight. The glass plate rests on this machined surface on top of the mount 33 and it is held on by a clamping plate 34 conforming to the shape of the mount. The clamping plate 34 is cushioned to the glass by a cork gasket 49 which is cemented to the plate. The light rays which pass through the reticule openings are projected onto the glass plate which reflects the reticule image to the observer's eye and at the same time permits him to see the target with the image appearing superimposed on the target, Figure 14.

To permit seeing the reticule image under bright sunlight conditions a sun filter 24 is provided with the sight. The sun filter is attached to a frame 50 in front of the reflecting plate 23 and pivoted 51 in such a manner that it is at 56° to the horizontal plane of the sight, when in use, when not in use the sun filter turns down close to the body of the sight.

The inclinometer 35 is similar to a glass level made in the shape of an arc except that a glass ball is used instead of an air bubble. It is attached to the reflector plate mount 33 with a thin metal mount. The inclinometer is positioned with the bubble position in the vertical plane of the sight, and the plane of curvature parallel to the reflector plate. On the lower side of the vial an opaque matte surface has been baked to eliminate the ghost image of the vial which appeared in the reflector plate.

*The angle solver*

In Figure 1 is shown the relationship between the speed triangle and the space triangle used by the torpedo director to solve for the sight angle necessary to accurately launch the torpedo. Since the distance is proportional to the speed the triangles are similar.

In the space triangle the line of sight is one side, the course of the target another and the course of the torpedo the third. This is the triangle of the direction vectors.

In the speed triangle the closing speed of the target and the torpedo is one side, the target speed another and the average torpedo speed another. This is the triangle of the velocity vectors.

The range is the distance from the sight to the target at the instant of launching.

The sight angle D is the computed angle between the line of sight and the final course of the torpedo.

The angle on the bow Ab is the angle between the fore and aft axis of the target ship and the line of sight to the target measured from 0 to 180° on the port or starboard side.

Track angle I is the angle between the target course and the reverse course of the torpedo measured from the target bow from 0° to 180° port or starboard.

The angle solver mechanism is designed to solve for the sight angle used in launching torpedoes. The angle solver is a mechanical solution of the diagram referred to above and is a simple slider crank mechanism $a'b'c'$.

Figure 3:
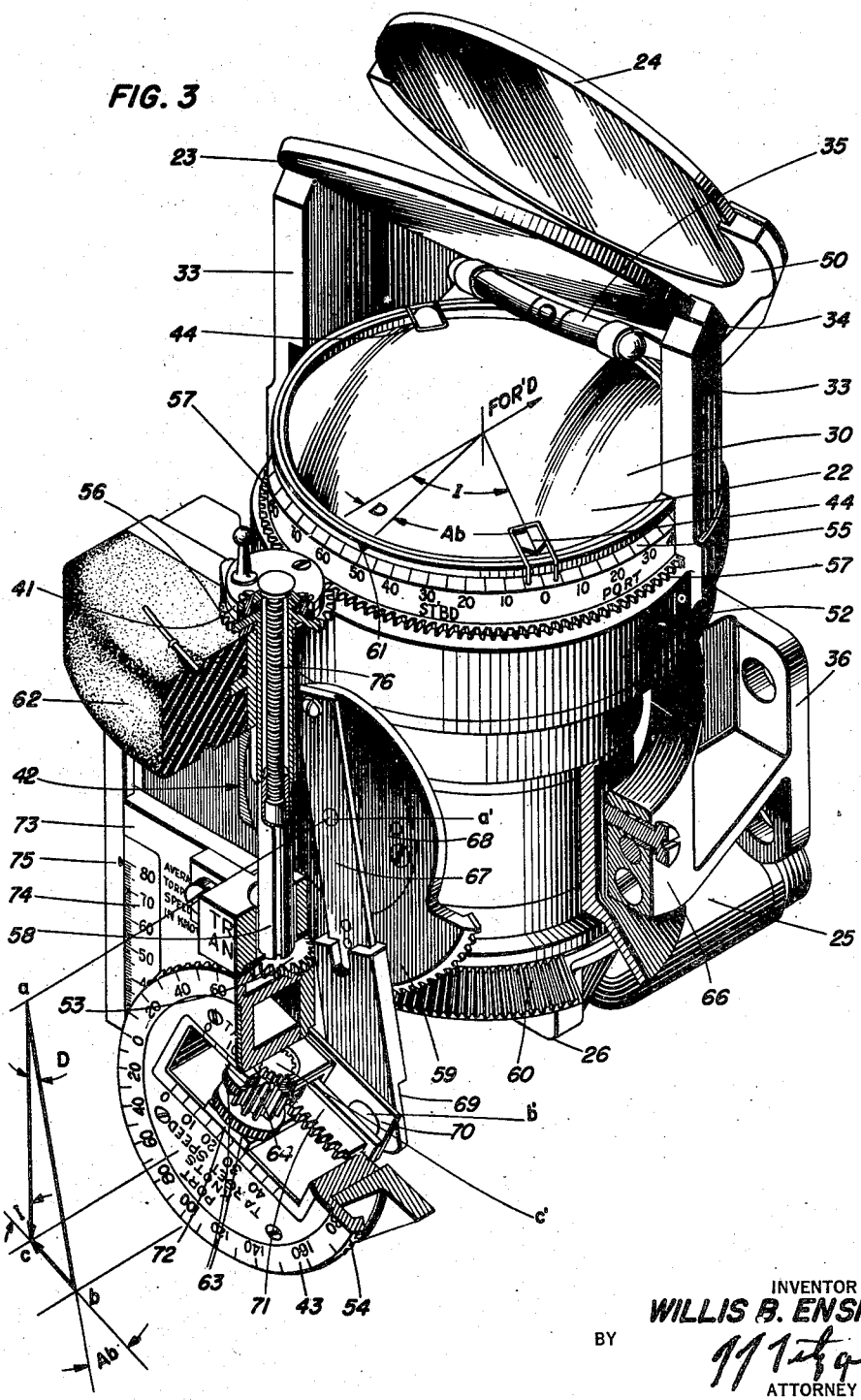
Figure 3 is a perspective view from the right side of the sight partly in section.

For purposes of illustration and clarity the torpedo problem triangle has been projected into the mechanism of Figure 3. The points $a$, $b$, and $c$ correspond to points $a'$, $b'$ and $c'$ in the mechanism.

The upper pivot, point $a'$, is mounted rigidly to the frame of the computer mechanism 42, and represents the intersection of the torpedo speed vector of the triangle and the line of sight, which is the point of release of the torpedo. The center of the stud on the sight angle arm slide, point $b'$, represents the point of aim at the target at the instant the torpedo is launched, which is also the intersection of the line of sight and the target speed vector of the triangle. The center of the track angle dial 43, point $c'$, represents the point of impact of the torpedo which is the intersection of the torpedo speed and the target speed sides of the triangle. When a target speed is set and the track angle dial 43 is turned (Figure 3) the mechanism acts to rotate the sight body 52 through a pair of bevel gears 53—54 and to rotate the angle on the bow dial 55 through two gear pairs 56—57 and a splined shaft 58. Sight angle is transmitted by a pair of bevel gears 59 and 60; one of which is keyed to the lower end of the sight body and the other is secured to the sight angle arm. (It will be noted that when the track angle dial 43 is rotated clockwise from zero starboard sight angles, port track angles, and port angles on the bow are set.) Since the index 61, Figure 5, at which angle on the bow is read is engraved on the sight body 52, it is evident that the reading of angle on the bow is track angle minus sight angle. This can be seen also from the diagrams of Figures 1 and 3. A pointer representing the target bow 44, Figure 3, is attached to the angle on the bow dial at the zero graduation and a pointer representing the target stern 44 is attached at the 180° graduation. When a practical problem is set up and the plane is headed with the line of sight on the target, the target heading will parallel a line between the pointers 44 secured to the track angle dial 55, providing the solution set up is correct.

A flange in front of the angle solver provides a support for a sponge rubber or face crash pad 62, Figure 2.

Limits

Figure 4:
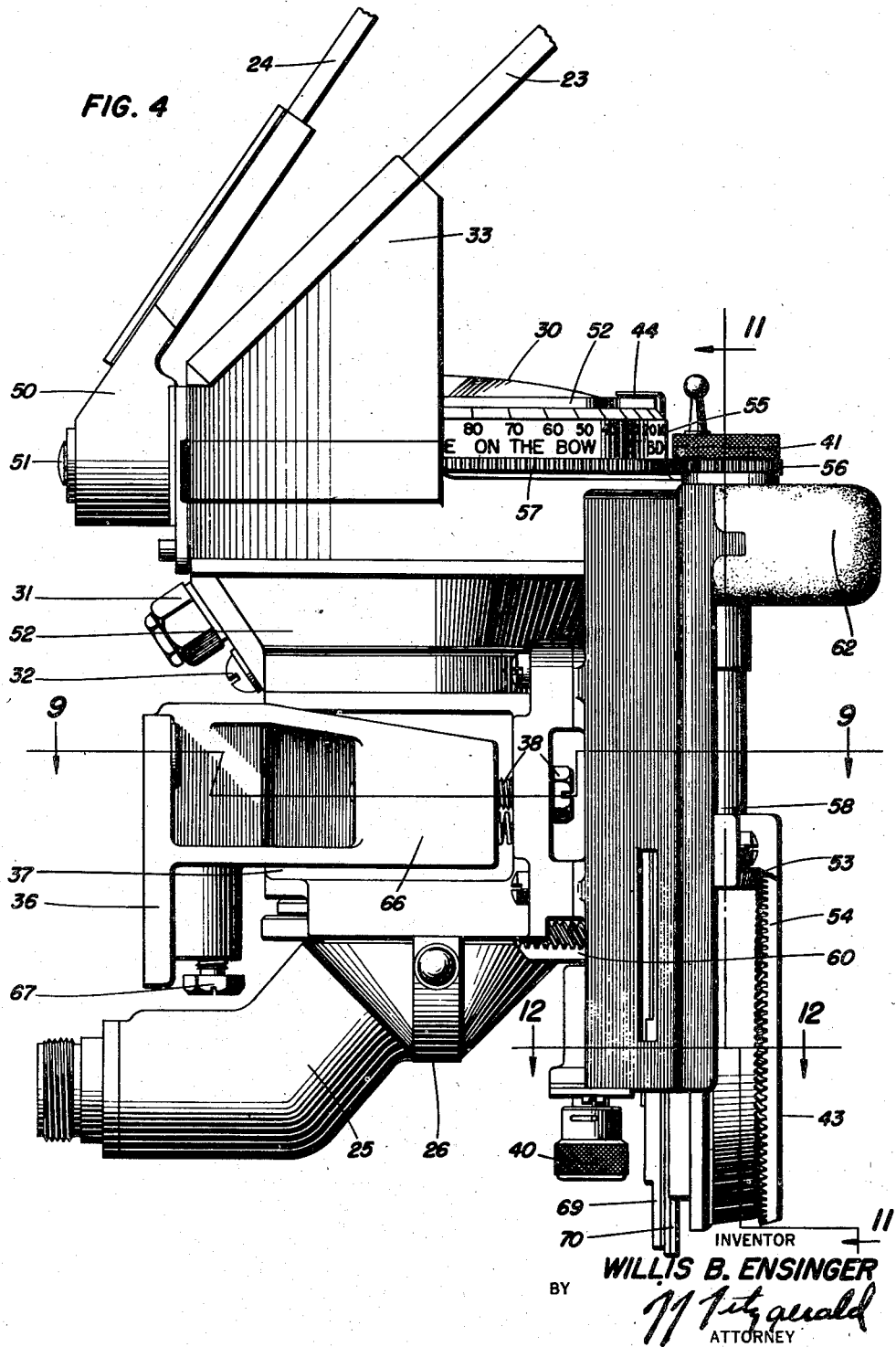
Figure 4 is the left elevation view of the sight.

The limits on the inputs and outputs of the subject instrument are as follows:

Average torpedo speed, 25 to 80 knots
Target speed, 0 to 45 knots
Sight angle, 60° right or left The mounting bracket 36 is best illustrated in Figures 3, 4 and 8. The optical elements of the sight just described are housed in a sealed case which can be rotated 60° right or left in a sleeve bearing. The sleeve bearing 37 in turn is attached to the mounting bracket 36 by means of a spring loaded ball and socket joint type of screw 38 on each side, Figure 4, and a spring loaded adjustable screw stop 39 in the rear, Figure 8. The three screws just mentioned serve as a means of boresighting or aligning the line of sight with the center lines of the fixed guns on the aircraft. These adjusting screws are designed to be locked with clamp screws or secured with safety wire.

Operation

1. As a fixed gunsight or dive bombing sight:
   (a) Set the track angle dial on zero, which automatically brings the angle on the bow dial to zero.
   (b) Pull down on the sight angle detent knob 40, Figures 4 and 8, on the lower side of the sight and turn it one quarter of a turn permitting it to be drawn into the centering slot provided.
   (c) Test the track angle dial to see if it is locked.
   (d) Illuminate the sight.

2. As a torpedo director:
   (a) To be operated as a torpedo director the instrument requires the following inputs:

*Average torpedo speed.*—For aircraft launched torpedoes, the average speed of the torpedo between its release and the instant it hits the target depends on the launching altitude, ground speed at launching, and the total length of the torpedo's travel or run from plane to target. The range and the torpedo run must not be confused, as they are two entirely different lines. The range is measured along a line from the plane to the target during the approach, while the run is measured along the path which the torpedo must take to intercept the target at a given point on its course, Figure 1. A simple device, similar to a circular slide rule, has been developed to compute the average speed of the torpedo. The inputs to this computer are ground speed, release altitude, and torpedo run with the average torpedo speed read in knots. It should be borne in mind that the average speed increases rapidly as the length of the run is reduced to 1500 yards and less. The average torpedo speed for a given run also increases when the launching altitude and launching velocity is increased. The value of torpedo speed is set into the instrument by means of the knob 41 at the top and center of the angle solver frame 42, Figures 2, 3, 4, 5, 8 and 11. When in the position of looking down on the instrument clockwise rotation of the knob increases the average torpedo speed setting.

Figure 12:
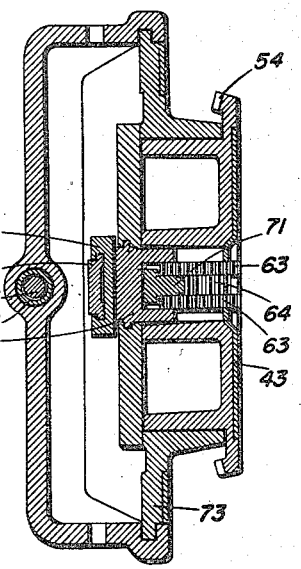
Figure 12 is a sectional view on line 12—12 of Figure 4.

*Target speed.*—Target speed is estimated by the operator and set into the instrument by pushing the knurled knobs 63, Figure 12, in the center of the track angle dial to move the attached gear along the target speed gear rack. A pair of spring loaded brake shoes retains the setting after it has been made. It should be noted that when target speeds are large and average topedo speeds are small the set value of sight angle can reach the 60° limit as the track angle dial is turned. When the angle on the bow is near 90°, torpedo speed near 50 knots, and the target speed setting at maximum, continued rotation of the track angle dial will force the target speed setting downward. It should be further noted that this condition would occur only when undesirable problem conditions have been set up.

Figure 5:
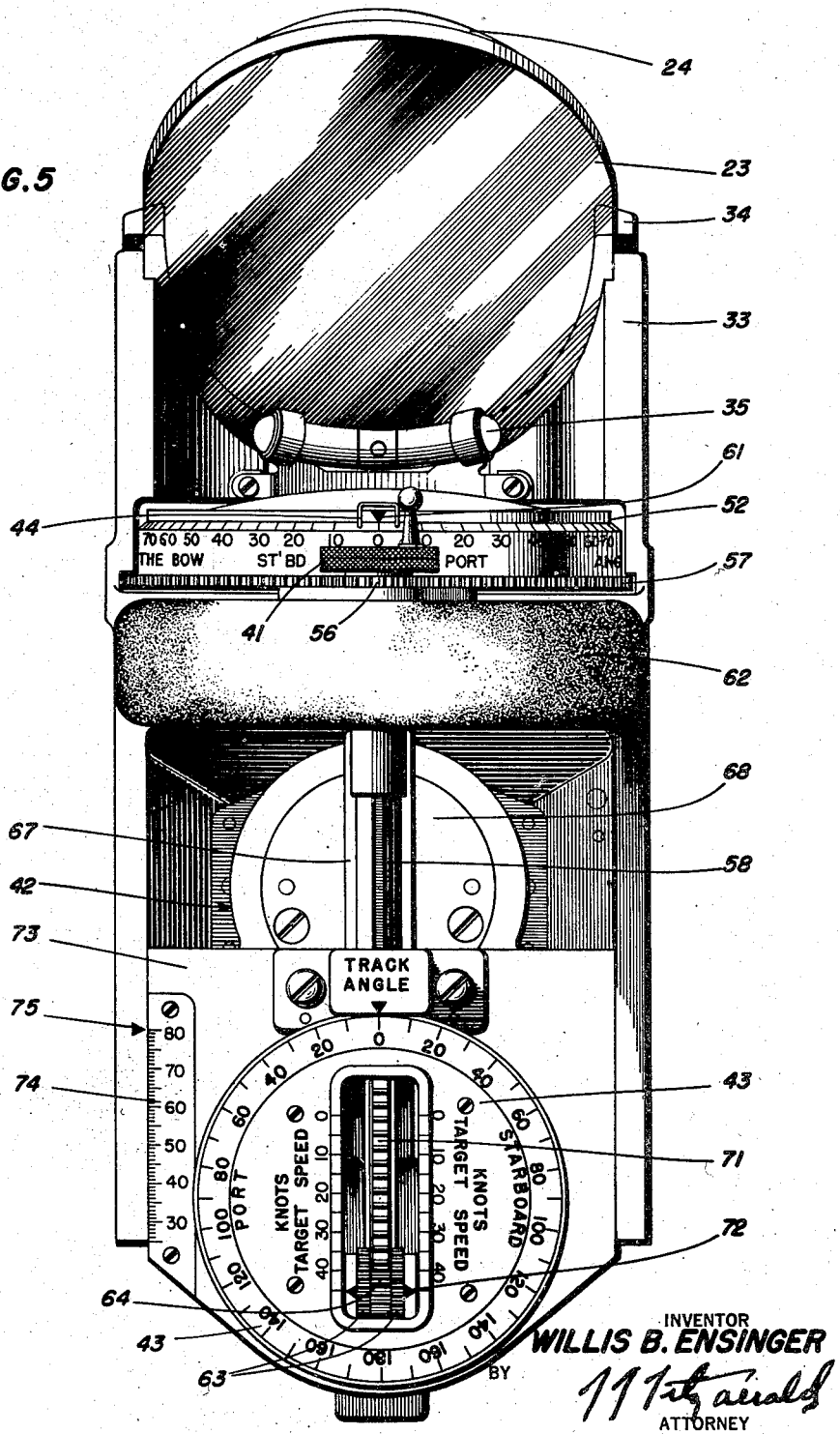
Figure 5 is a front elevation view of the sight.
Figure 6:
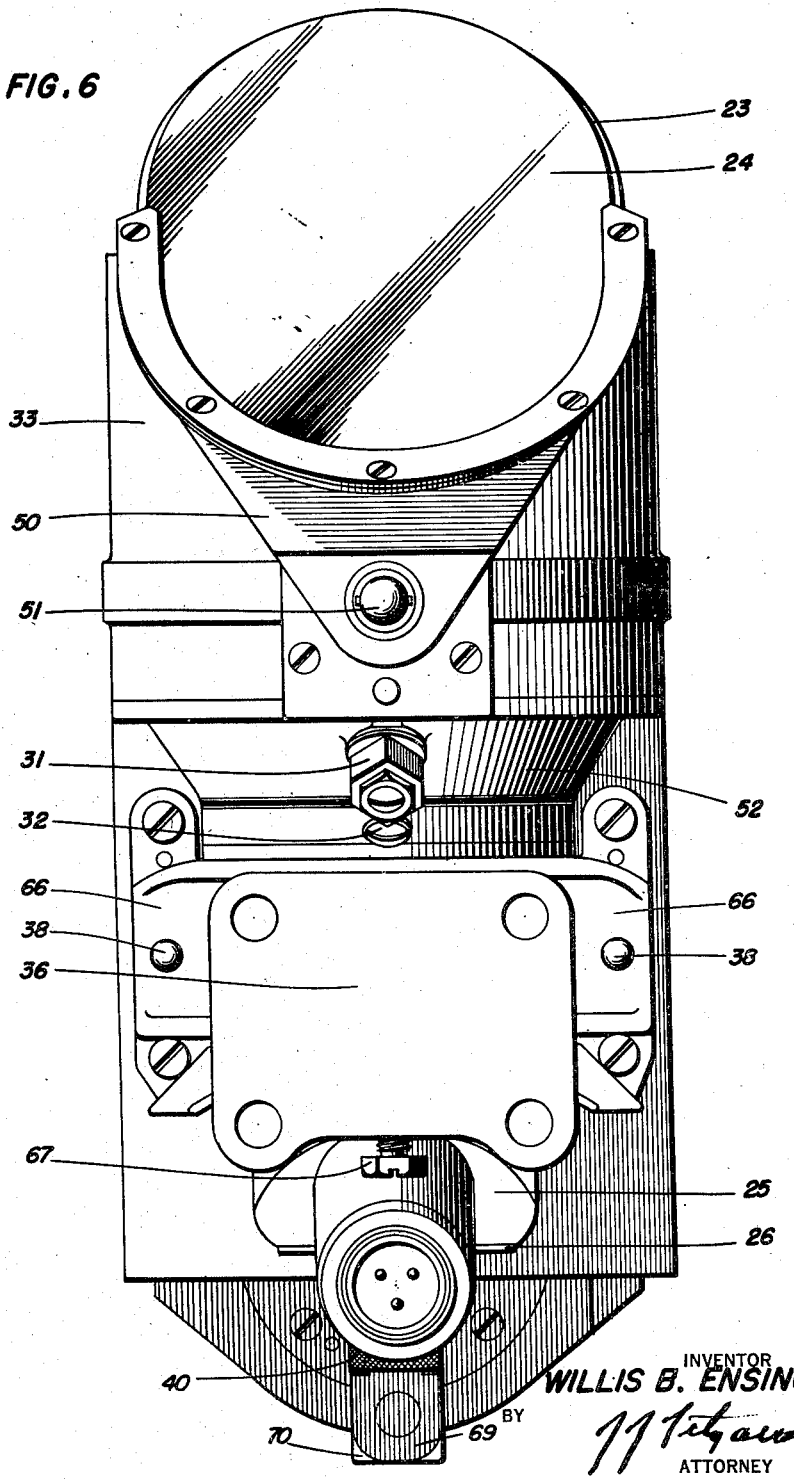
Figure 6 is a rear elevation view of the sight.
Figure 7:
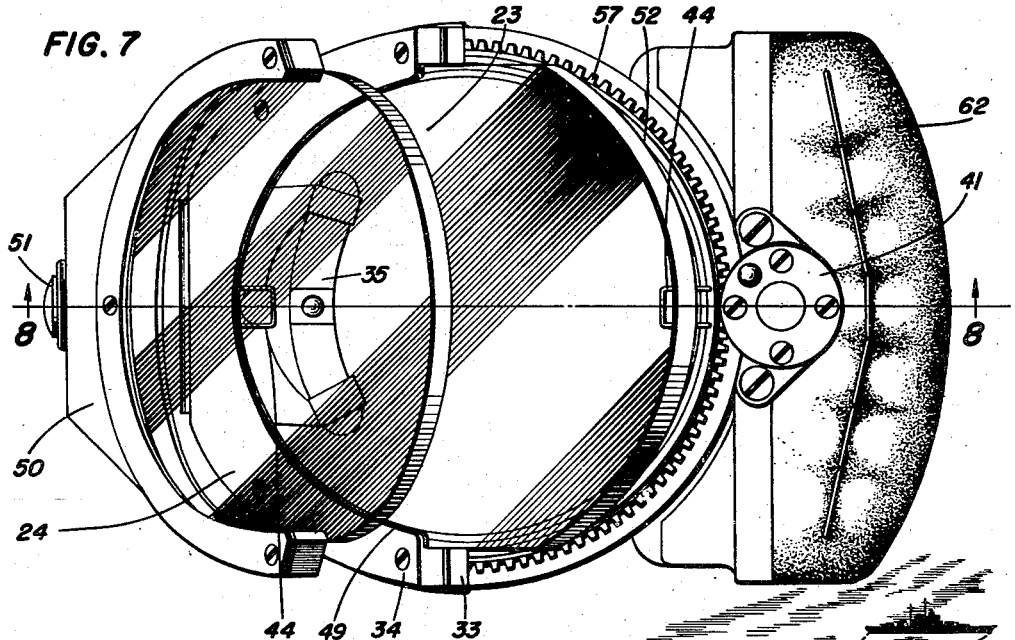
Figure 7 is a top plan view of the sight.

*Angle on the bow.*—The introduction of this input into the instrument requires the rotation of the track angle dial 43 until the index 61 on the sight body 52 and the angle on the bow dial 55 match at the estimate of angle on the bow which the pilot has made. Angle on the bow and track angle have no limiting stops when average torpedo speed minus target speed is greater than 12.4 knots. The procedure involved in the estimation of angle on the bow and its introduction into the instrument is to be determined on the basis of doctrine and conditions of the attack. The following are considered to be possible procedures:

(a) Estimate angle on the bow and set it on the angle on the bow dial 55 by turning the track angle dial 43, Figures 2, 3 and 5. With line of sight (illuminated cross hairs) on the target the bow and stern pointers 44 should parallel the target ship if estimation of angle was correct.

(b) With the plane flying toward the target ship parallel the bow and stern pointers with the outline of the ship. Turn plane to bring line of sight (illuminated cross hairs) on target. When the cross hairs are on, a glance at the target and the bow stern pointers on the dial will prove the pointers to be no longer parallel with the course of the target. This is corrected by turning the track angle dial 43, thus moving the bow and stern pointers to again parallel the course of the target, plus an additional turn approximately equal to ½ of the adjustment made to parallel the pointers with the course of the target. At this point the line of sight is off again, but changing the course of the plane to bring it on will bring the operator very close to a solution of the angle on the bow portion of the problem. When a solution is obtained the pointers parallel the target and the cross hairs are on the target.

*Track angle.*—Another procedure which may be followed to obtain a solution is to set the estimated value of track angle, Figure 1, into the instrument on the track angle dial. After this initial estimation of track angle has been made the procedure of (b) above may be followed to correct for errors in track angle estimate.

*Operation procedure.*—Determine conditions of attack.

(a) Average torpedo speed. Read average torpedo speed from the average torpedo speed computer by putting the following valves into the computer.
   1. Anticipated launching altitude.
   2. Anticipated launching ground speed of aircraft.
   3. Estimated torpedo run.
   4. Set average torpedo speed into the instrument by spinning the average torpedo speed knob 41 on top and in the center of the director body, Figures 4 and 8, turning to the right to increase speed and to the left to decrease, which is read on scale 74.

(b) Estimate the target speed and set it into the instrument by applying thumb pressure on the two knurled knobs 63 in the center of the track angle dial 43 to rotate the attached gear 64 toward the reading desired.

(c) Estimate the angle on the bow or track angle set it into the instrument, and follow the instructions set forth under "Angle on the bow" above.

Continual adjustment of the set up will probably be necessary due to target maneuvers, up to the point where the conditions anticipated for release are reached. With the line of sight on the target and the airplane straight and level at anticipated altitude, ground speed, and range the torpedo is released.

Figure 9:
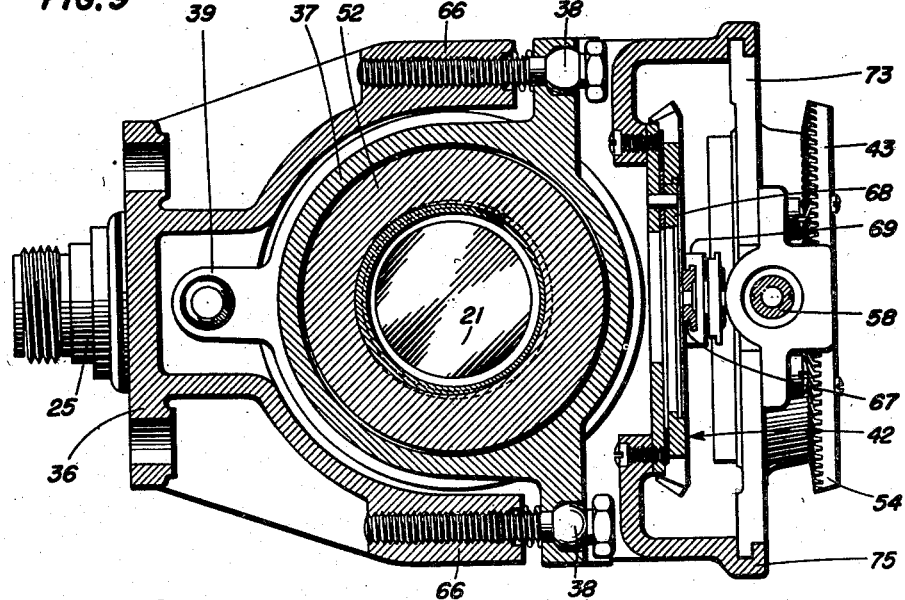
Figure 9 is a section view on line 9—9 of Figure 4.

As an article of manufacture the torpedo director comprises a mounting bracket generally designated 36 in Figure 9. This bracket has two arms 66 that form a semi-circle to receive the director positioning or boresighting studs 38 which are spring biased for horizontal adjustment. The vertical adjustment is made on a spring biased third mounting point 39 and is set by stud 67.

To the mounting bracket is attached bearing ring 37, Figures 4 and 8, in which the body of the sight is freely rotatable except when locked by detent knob 40.

Figure 10:
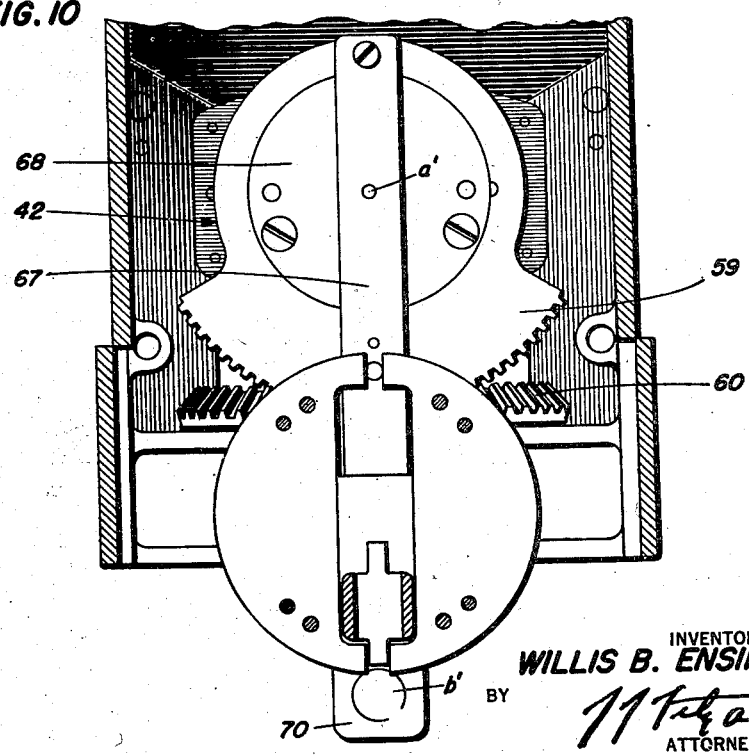
Figure 10 is a sectional view on line 10—10 of Figure 8.
Figure 11:
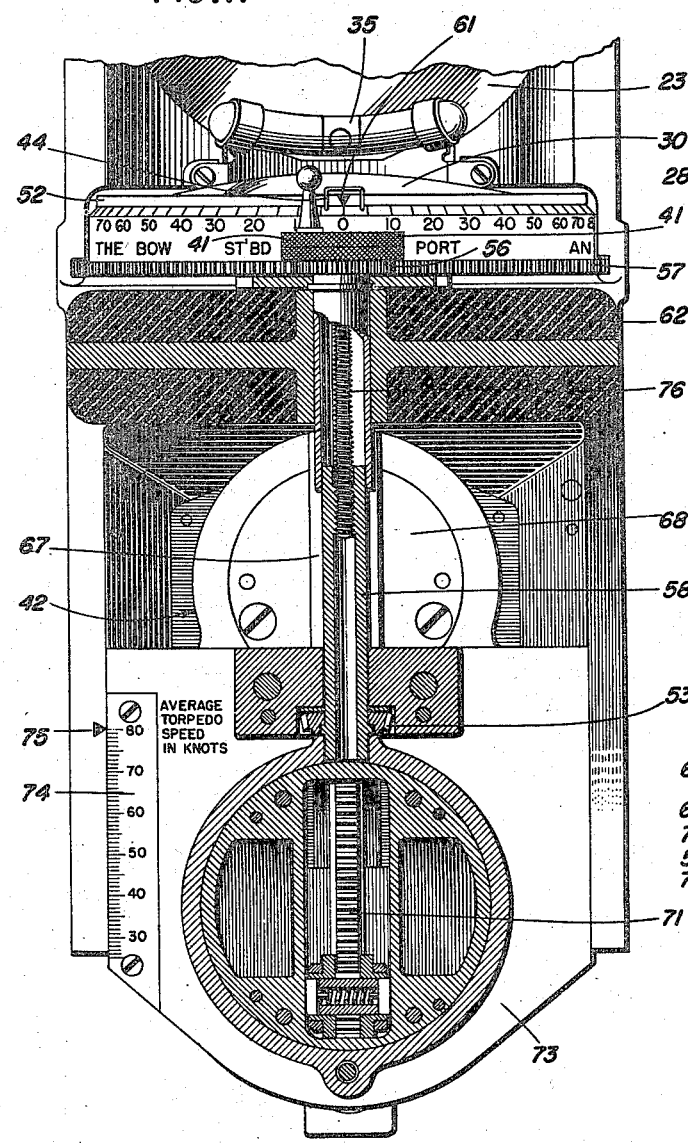
Figure 11 is a sectional view on line 11—11 of Figure 4.

Mounted on the bearing ring is the triangle supporting frame 42 for the triangle solving mechanism, Figures 10 and 8. This frame has a flange at the top to which is attached a crash pad 62 to protect the operator's face if he happens to crash while adjusting or operating the sight.

The pivot a' of the triangle solver is on plate 68, Figure 10, mounted on the triangle supporting frame 42. The pivot is in the line of sight bar 67 which is firmly attached at its upper end to bevel gear 59 for transmitting the sight angle to the reflector sight, on its lower end slide 69 functions to accommodate pivot b' which is the intersection of the line of sight and target course vectors.

The target course vector becomes the target speed vector 70 in the velocity triangle. The speed arm 70, Figure 8, is adjustable for estimate target speed by pinion 64 attached to arm 70 and operating on rack 71 mounted on the track angle dial 43. Since the rack 71 is on the track angle dial, the target speed scale is likewise mounted thereon, and a projection of the speed arm 70 carries an index 72 for setting the estimated target speed by thumb wheels 63.

The track angle dial is mounted upon a slidable frame 73 which carries a scale 74, Figure 3, for indicating the torpedo speed by index 75. The torpedo speed is set by rotating knob 41 which turns screw 76 in threads on splined sleeve 58, Figure 8, thus moving frame 73 and scale 74 relative to index 75.

The estimated track angle is transmitted from the dial 43 by gears 54 and 53 to splined sleeve 58, which in turn through gears 56 and 57 sets the angle on track angle ring 55 mounted on the reflector sight.

On the track angle ring are mounted two pointers 44, 180° apart and on the reflector sight body is index 61, Fig. 3. Since the angle on the bow is the track angle minus the sight angle, the two pointers represent the target course and are consequently parallel thereto. The original estimates may be checked by noting the parallelism of the pointers with the target course.

The reflector sight is well known, and it is composed of lamp housing 25 demountably attached to the sight body 52, in which a lamp 20 illuminates a reticule 21 to be projected by the optical system 22 into the reflecting screen 23.

One of the important results accomplished in the design of this sight is a rugged instrument that is easily operated by the hands when enclosed in heavy gloves such as worn by aviators at high altitudes and in cold climates.

The average torpedo speed adjustment 41 has knurled edges for bare finger adjustment; however, it also has a handle like projection perpendicular to the discs 41 that may be firmly held and operated by fingers enclosed in heavy gloves.

The track angle dial 43 is large and easily grasped, and bevel gear 54 extending to the periphery furnishes a knurled like surface that will not slip on glove material. To set the dial it may be grasped between the thumb and fingers or it may be rolled along any surface of the gloved hand placed tangent thereto.

The target speed adjustment has knurled discs 63 which are set by placing the palm side of the thumb thereover and rolling on the surface thereof. The knurls are of large size on the discs, comparable to gear teeth 54, for glove operation as distinguished from the small knurls on discs 41 of the torpedo speed adjustment for bare finger operation.

The invention described herein may be manufactured and used by or for the Government of the United States of America for governmental purposes without the payment of any royalties thereon or therefor.

I claim:

1. A combined sighting and angle solving device for use in aircraft for directing a projectile upon a collision course with respect to a moving target comprising, a sighting device mounted for bodily rotation and having an index thereon, said sighting device having an inclined light reflecting and transmitting plate and means for projecting an illuminated reticle image onto said plate, an angle on the bow ring having a scale graduated to correspond to the angle on the target bow, the graduations being disposed adjacent an index and the ring being rotatable about the axis of the sighting device to bring the graduations adjacent the index, an angle solving mechanism linked to the sighting device and the angle on the bow ring so as to relatively to move those parts said angle solver including three extensible links pivoted together at their ends to form a triangle, means for varying the length of the first link in proportion to average torpedo speed, means for varying the length of a second link in proportion to target speed, and means for adjusting the angle opposite the average torpedo speed link to correspond to the angle on the target bow, means for bodily rotating the sight in proportion to the angle between the first and third sides of the triangle, and means for rotating the angle on the bow ring in proportion to the angle between the second and third side of the triangle so as to indicate the required sight angle in order to intercept the target.

2. A sighting and angle solving mechanism for use in aircraft for launching torpedoes upon a course to intercept a moving target comprising, a substantially cylindrical housing, a reticle projecting optical system mounted within said housing, a light reflecting and transmitting plate mounted adjacent one end of the housing to receive the projected reticle thereon, a sleeve within which said housing is mounted for rotation, a mechanical solver for determining the sight angle necessary to produce collision of the torpedo with a moving target comprising a supporting frame located upon said sleeve, three links movably secured adjacent their ends and supported by said frame, adjustable means for extending one of said links in proportion to the target speed, means for adjustably extending another of said links in proportion to the average torpedo speed, means for adjustably extending the remaining link in proportion to the closing speed between the target and the torpedo, and means including geared sectors between said housing and said angle solver for applying the sight angle so obtained to the cylindical housing by rotating same to change the reticle position whereby the sight angle necessary in order to cause interception of the target by the torpedo is indicated.

3. A sighting and angle solving mechanism for use in aircraft for launching torpedoes upon a course to intercept a moving target comprising, a substantially cylindrical housing, a reticle projecting optical system mounted within said housing, a light reflecting and transmitting plate mounted adjacent one end of the housing to receive the projected reticle thereon, a sleeve within which said housing is mounted for rotation, a mechanical solver for determining the sight angle necessary to produce collision of the torpedo with a moving target comprising a supporting frame located upon said sleeve, three links movably secured adjacent their ends and supported by said frame, adjustable means for extending one of said links in proportion to the target speed, means for adjustably extending another of said links in proportion to the average torpedo speed, means for adjustably extending the remaining link in proportion to the closing speed between the target and the torpedo, and means including geared sectors between said housing and said angle solver for applying the sight angle so obtained to the cylindrical housing by rotating same to change the reticle position whereby the sight angle necessary in order to cause interception of the target by the torpedo is indicated, and an angle on the bow ring adjacent the cylindrical housing and having pointers extending over the edge thereof said ring being mechanically connected to the angle solver for rotation thereby.

WILLIS B. ENSINGER.

REFERENCES CITED

The following references are of record in the file of this patent:

UNITED STATES PATENTS

| Number | Name | Date |
| --- | --- | --- |
| 1,160,184 | Mackensen | Nov. 16, 1915 |
| 1,939,517 | Paulus et al. | Dec. 12, 1933 |
| 2,125,225 | Gourdou | July 26, 1938 |
| 2,183,530 | Alkan | Dec. 19, 1939 |
| 2,190,569 | Macgill | Feb. 13, 1940 |
| 2,232,518 | Everitt | Feb. 18, 1941 |
| 2,354,720 | Wagner | Aug. 1, 1944 |
| 2,384,036 | Klemperer et al. | Sept. 4, 1945 |
| 2,384,098 | Klemperer | Sept. 4, 1945 |
| 2,391,357 | Sperr, Jr., et al. | Dec. 18, 1945 |
| 2,412,585 | Klemperer et al. | Dec. 17, 1946 |

FOREIGN PATENTS

| Number | Country | Date |
| --- | --- | --- |
| 827,407 | France | Jan. 24, 1938 |
| 666,562 | Germany | Oct. 24, 1938 |
| 538,422 | Great Britain | Aug. 1, 1941 |
| 114,360 | Australia | Dec. 1941 |